United States Patent
Virtej et al.

(10) Patent No.: US 9,894,705 B2
(45) Date of Patent: Feb. 13, 2018

(54) SELF-ADJUSTING DISCONTINUOUS RECEPTION PATTERN

(75) Inventors: Elena Virtej, Espoo (FI); Jari Petteri Lunden, Espoo (FI); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1404 days.

(21) Appl. No.: 13/294,630

(22) Filed: Nov. 11, 2011

(65) Prior Publication Data

US 2013/0121220 A1 May 16, 2013

(51) Int. Cl.
*H04W 76/04* (2009.01)
*H04W 52/02* (2009.01)

(52) U.S. Cl.
CPC ..... *H04W 76/048* (2013.01); *H04W 52/0241* (2013.01); *H04W 52/0216* (2013.01); *Y02B 60/50* (2013.01)

(58) Field of Classification Search
CPC .................................................. H04W 76/048
See application file for complete search history.

(56) References Cited

U.S. PATENT DOCUMENTS

2003/0185162 A1  10/2003 Fraser et al.
2007/0291729 A1* 12/2007 Dalsgaard et al. ........... 370/347
2008/0181127 A1  7/2008 Terry et al.
2011/0237231 A1*  9/2011 Horneman et al. ........ 455/414.1
2012/0120843 A1*  5/2012 Anderson et al. ............ 370/253

FOREIGN PATENT DOCUMENTS

| CN | 101925161 A | 12/2010 |
|---|---|---|
| WO | 2009030251 A1 | 3/2007 |
| WO | WO2010/019400 A1 | 2/2010 |
| WO | WO2010/044721 A1 | 4/2010 |

OTHER PUBLICATIONS

IEEE P802.16m/D12, Sleep Mode, Feb. 17, 2011, pp. 485-493.
ETSI TS 136321 V10.3.0, Nov. 2011, Technical Specification, LTE; Evolved Universal Terrestrial Radio Access (E-UTRAN); Medium Access Control (MAC) Protocol Specification (3GPP TS 36.321 version 10.3.0 Release 10), pp. 1-56.
HaiBo Xu, et al., "An improved dynamic user equipment power saving mechanism for LTE system and performance analysis", Science China Information Sciences, Research Papers, Oct. 2010, vol. 53, No. 10, pp. 2075-2086.

(Continued)

*Primary Examiner* — Alvin Zhu
(74) *Attorney, Agent, or Firm* — Squire Patton Boggs (US) LLP

(57) ABSTRACT

Radio access networks and particularly enhancements for diverse data applications may benefit from a self-adjusting discontinuous reception (DRX) pattern. According to certain embodiments, for example, a method may include configuring a discontinuous reception pattern of a user equipment and adjusting the discontinuous reception pattern at the user equipment autonomously with respect to a base station.

20 Claims, 4 Drawing Sheets

(56) References Cited

OTHER PUBLICATIONS

Shun-Ren Yang, "Dynamic Power Saving Mechanism for 3G UMTS System," Department of Computer Science, National Tsing Hua University, Hsinchu, Taiwan, ROC, http://www.cs.nthu.edu.tw/~sryang/paper/DPSM3US.pdf, 10 pages.

Suckchel Yang, et al., "Adaptive Discontinuous Reception Mechanism for Power Saving in UMTS", IEEE Communications Letters, vol. 11, No. 1, Jan. 2007, pp. 40-42.

Weili Ren, et al.,"Adaptive DRX Scheme for Optimal Power Saving", Jan. 17, 2008, pp. 1-6.

Ericsson: "A Semi-Autonomous DRX Control Scheme for LTE Active", 3GPP Draft; R2-071393, 3rd Generation Partnership Project (3GPP), Mobile Competence Centre; 650, Route DES Lucioles; F-06921 Sophia-Antipolis Cedex; France, vol. Ran WG2, no. St. Julian; Mar. 22, 2007, Mar. 22, 2007.

European International Search Report for EP Application No. 12188756.6, dated Mar. 22, 2013.

Ericsson ST-Ericsson, "Further Enhanced UE DRX", 3GPP TSG RAN WG2 #75bis, Zhuhai, China, Oct. 10-14, 2011, R2-115050, pp. 1-6.

European Office Action issued in corresponding European Application No. 12 188 756.6 dated May 2, 2016.

First Office Action dated Dec. 2, 2014, issued in Chinese Patent Application No. 201210392332.X, 10 pages.

Second Office Action dated Sep. 7, 2015, issued in Chinese Patent Application No. 201210392332.X, 11 pages.

European Office Action issued in corresponding European Application No. 12 188 756.6 dated Jun. 19, 2017.

Rejection Decision dated Apr. 1, 2016, issued in corresponding Chinese Patent Application No. 201210392332.X.

\* cited by examiner

SELF-ADJUSTING DISCONTINUOUS RECEPTION PATTERN

BACKGROUND

Field

Radio access networks and particularly enhancements for diverse data applications may benefit from a self-adjusting discontinuous reception (DRX) pattern. Enhancements to DRX configuration/control mechanisms can be more responsive to the needs and activity of either single or multiple applications running in parallel, with improved adaptability to time-varying traffic profiles and to application requirements, thereby allowing for an improved optimization of the trade-off between performance and user equipment's battery consumption.

Description of the Related Art

Various discontinuous reception (DRX) operations exist with respect to the long term evolution (LTE) of the 3rd generation partnership project (3GPP). One example of a specification regarding discontinuous reception in LTE is technical specification (TS) 36.321. Various mechanisms include a sleep mode and other power saving mechanisms. For example, a base station may control the DRX adjustment by higher layer signaling between user equipment and network.

When traffic is bursty with varying amounts of data coming at long and possibly irregular intervals, it is difficult to configure the discontinuous reception optimally for a longer period of time using conventional discontinuous reception functionality.

A network may opt, therefore, to configure the on-duration and inactivity timer values quite long (for example, 50-200 ms) compared to average duration it takes to handle one short traffic burst. If the timers are set shorter, the conventional view is that the scheduling flexibility is reduced. Moreover, frequent reconfiguring the discontinuous reception of the user equipment to match the varying conditions causes signaling overhead, so networks conventionally configure a setting based on a worst case. This results in power consumption of the user equipment being high, decreasing the battery lifetime of the user equipment, or the signaling overhead being high and thus also reducing the network capacity available for data transmission.

However, there are no conventional enhancements to DRX configuration/control mechanisms to be more responsive to the needs and activity of either single or multiple applications running in parallel, with improved adaptability to time-varying traffic profiles and to application requirements, thereby allowing for an improved optimization of the trade-off between performance and battery consumption in user equipment.

SUMMARY

According to certain embodiments, a method includes configuring a discontinuous reception pattern of a user equipment. The method also includes adjusting the discontinuous reception pattern at the user equipment autonomously with respect to a base station.

An apparatus according certain embodiments, includes configuring means for configuring a discontinuous reception pattern of a user equipment. The apparatus also includes adjusting means for adjusting the discontinuous reception pattern at the user equipment autonomously with respect to a base station.

A computer readable medium in certain embodiments is encoded with instructions that, when executed in hardware perform a process. The process includes configuring a discontinuous reception pattern of a user equipment. The process also includes adjusting the discontinuous reception pattern at the user equipment autonomously with respect to a base station.

An apparatus includes, in certain embodiments, at least one processor and at least one memory including computer program code. The at least one memory and the computer program code are configured to, with the at least one processor, cause the apparatus at least to configure a discontinuous reception pattern of a user equipment. The at least one memory and the computer program code are also configured to, with the at least one processor, cause the apparatus at least to adjust the discontinuous reception pattern at the user equipment autonomously with respect to a base station.

According to certain embodiments, a method includes configuring a discontinuous reception pattern of a user equipment. The method also includes determining an adaptive state of the discontinuous reception pattern of the user equipment based on the discontinuous reception pattern and at least one adaptation rule.

An apparatus according certain embodiments, includes configuring means for configuring a discontinuous reception pattern of a user equipment. The apparatus also includes determining means for determining an adaptive state of the discontinuous reception pattern of the user equipment based on the discontinuous reception pattern and at least one adaptation rule.

A computer readable medium in certain embodiments is encoded with instructions that, when executed in hardware perform a process. The process includes configuring a discontinuous reception pattern of a user equipment. The process also includes determining an adaptive state of the discontinuous reception pattern of the user equipment based on the discontinuous reception pattern and at least one adaptation rule.

An apparatus includes, in certain embodiments, at least one processor and at least one memory including computer program code. The at least one memory and the computer program code are configured to, with the at least one processor, cause the apparatus at least to configure a discontinuous reception pattern of a user equipment. The at least one memory and the computer program code are also configured to, with the at least one processor, cause the apparatus at least to determine an adaptive state of the discontinuous reception pattern of the user equipment based on the discontinuous reception pattern and at least one adaptation rule.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
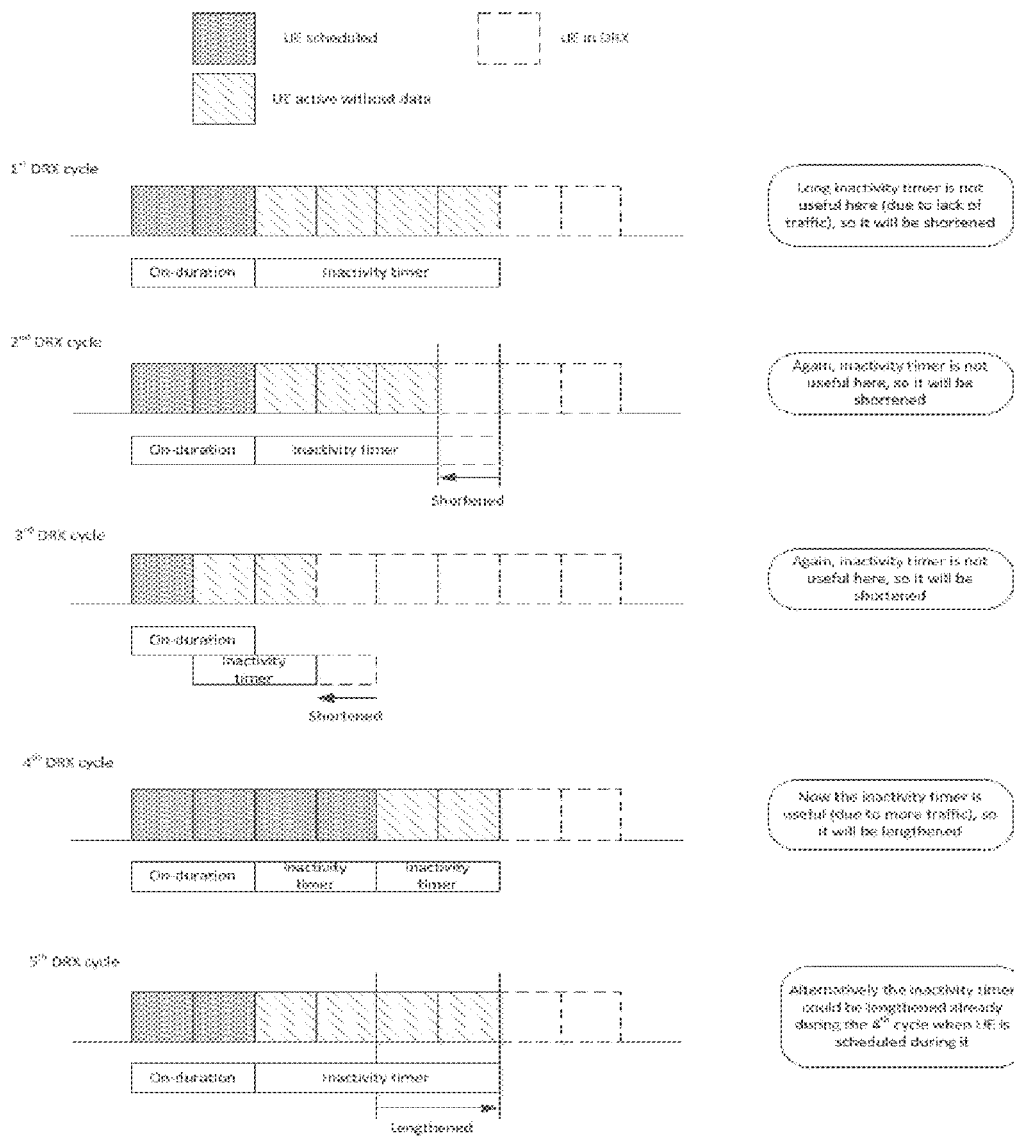
FIG. 1 illustrates operations of certain embodiments.

Certain embodiments provide discontinuous reception (DRX) configuration/control mechanisms that are responsive to the needs and activity of either single or multiple applications running in parallel. Certain embodiments also have adaptability to time-varying traffic profiles and to application requirements. Thus, certain embodiments allow for a desired balance between performance power usage (for example, battery consumption) of a user equipment (UE).

In certain embodiments, the user equipment may be configured with discontinuous reception functionality that allows it to stop monitoring a physical downlink control channel (PDCCH) during some period of time. The configuration of the user equipment (for example, an initial configuration) can be performed by a network element using radio resource control (RRC) or medium access control (MAC) signaling.

In certain embodiments, more particularly, user equipment and/or evolved Node B (eNB) (or other base stations) can automatically adjust the discontinuous reception duration (the inactivity timer and the on-duration timer) based on active scheduling (where within the discontinuous reception cycle user equipment is scheduled) without signaling (or without additional signaling) from the eNB. The user equipment configuring its own timers without any signaling (or without any additional signaling after the initial configuration) can be referred to as "autonomous" operation of the user equipment. This "autonomous" operation may, however, be based on the known rules between a user equipment (UE) and evolved Node B (eNB) and hence, predictable.

For example, in certain embodiments, a user equipment can adjust the length of on-duration, inactivity timer, and/or discontinuous reception cycle length or other DRX related parameters.

Rules can be used by the user equipment for such adjustments. The rules can be based on where and how often within a discontinuous reception cycle user equipment is scheduled successfully. Successful scheduling may be determined based on the physical downlink control channel (PDCCH) being correctly received including scheduling for the user equipment. Alternatively, successful scheduling may be determined based on successfully decoding a PDCCH indicating an initial uplink (UL) or downlink (DL) user data transmission for the user equipment.

The rules can include any of the following, in any combination: whether user equipment is scheduled during on-duration, whether user equipment is scheduled during in-activity timer, how long the active time was, how long the active time would have needed to be, and how the scheduling pattern was, for example, density, frequency, periodicity, or hybrid automatic repeat request (HARQ) state. Both sides (user equipment and network) can know the rules in advance, so these adaptations can take place without further signaling. Moreover, in general because the network knows the rules and the bases upon which the user equipment applies the rules, the network may be able to know the state of the user equipment with respect to these adaptations without signaling from the user equipment.

Accordingly, in certain embodiments, there is a self-adapting discontinuous reception pattern based on having a static discontinuous reception part and a self-adapting discontinuous reception part. Instead of a discontinuous reception pattern consisting only of fixed discontinuous reception parameters set by the network, in certain embodiments the conventionally fixed length on-duration timer (onDurationTimer) and conventionally fixed length inactivity timer (drx-InactivityTimer) are self-adapting parameters in the discontinuous reception configuration.

In certain embodiments, therefore, the discontinuous reception pattern parameters (including, for example, the discontinuous reception timer lengths described above) are being adapted automatically in the user equipment. For example, the lengths of the discontinuous reception timers may be automatically adjusted based on active scheduling, for example, based on where within the discontinuous reception cycle the user equipment is scheduled.

While in some embodiments, there may be a static part and a dynamic or adaptive part, in certain embodiments, a full self adaptive scheme can be utilized.

Thus, in certain embodiments, a user equipment self-adapts the discontinuous reception pattern. In other words, a user equipment autonomously (but possibly guided by rules) can adapt the discontinuous reception pattern based on a changing scheduling activity. In particular, a user equipment can adjust the length of an on-duration, inactivity timer, and/or discontinuous reception cycle length.

For example, in certain embodiments each time an inactivity timer is triggered (for example, due to UE being scheduled), the timer is progressively lengthened (potentially to some maximum length) for the next cycle or triggering. In another embodiment, the length of on-duration can be similarly adapted by the user equipment. Conversely, if the inactivity timer is not triggered or used, the inactivity timer can be shortened for the next cycle or triggering.

FIG. 1 illustrates operations of certain embodiments. As shown in FIG. 1, the user equipment is configured as follows. In case of discontinuous reception use, instead of having fixed duration on-duration timer or inactivity timer, those timers are adapted based on whether the user equipment is scheduled or not, thus adapting the discontinuous reception pattern to current traffic. FIG. 1 illustrates how an inactivity timer can be adapted in consecutive discontinuous reception cycles based on whether the inactivity timer was used or not. For example, when the user equipment is not scheduled during the inactivity timer, the timer is shortened. Likewise, when the user equipment is scheduled during the inactivity timer, the timer is reset to an original value (or lengthened).

As shown in FIG. 1, in a first discontinuous reception (DRX) cycle, a user equipment has a short on-duration (two units of time) followed by a long inactivity timer (four units of time) and two additional units of time with the user equipment having option to power off the receiver (that is, be in DRX).

As shown, the user equipment may determine (for example, based on defined or configured rules) that a long inactivity timer is not useful here, due to lack of traffic, and so may determine to shorten the inactivity timer in a subsequent cycle. Alternatively, the shortening may be based on more than one such cycle in which the long inactivity timer turns out not to have been necessary. In this example, the initial length of the inactivity timer may be a fixed amount. However, in another example, the initial length of the inactivity timer may be based on the scheduled transmissions or on the length of the on-duration timer.

In a second discontinuous reception cycle, the inactivity timer is shortened by one unit. However, again, the inactivity timer is found to be unnecessarily long, and can be shortened again. In an alternative embodiment, the inactivity timer can have been more aggressively shortened after an initial decision to shorten the inactivity timer.

In a third discontinuous reception cycle, the inactivity timer may again be deemed unnecessarily long and may be shortened. In this case, the inactivity timer may have an overlap with the on-duration timer (that is, on the second time unit of the DRX cycle, both on-duration timer and inactivity timer are running). It should be noted that in this illustration, the on-duration timer is essentially static, while the inactivity timer is dynamic. However, there is no requirement that the on-duration timer be static and what is explained here using the inactivity timer as example can in principle also be applied to on-duration timer (or both).

In a fourth discontinuous reception cycle, the inactivity timer may have greater usefulness due to the greater amount of activity and may be lengthened. For example, the length of the inactivity may be based on a level of activity, as the activity progresses.

In a fifth discontinuous reception cycle, the inactivity timer can be proactively lengthened when a UE is scheduled in it. Thus, for example, the fifth discontinuous reception cycle as shown may illustrate an alternative to the fourth discontinuous reception cycle as shown.

Alternatively, the inactivity timer or on-duration can be adapted based on the overall length of activity in previous discontinuous reception cycle(s). Another option is to adjust the discontinuous reception parameters based on the effective length of active time in the previous cycle. The effective length can be defined to be from a start of the cycle to when the user equipment was last successfully scheduled in that cycle—not counting any "unnecessary" activity in the end where the user equipment is just waiting to go into discontinuous reception. The principle of that adaptation can be such that if the active time is too extensive compared to the need, it is shortened (by adapting, for example, on-duration or inactivity timer). And if the active time is too short and would benefit from being extended, it is lengthened.

Both the user equipment and the network may need to know the rules regarding how the cycle changes. Thus, the user equipment can autonomously change the timers or other characteristics of the cycle without further signaling from the network, and the network can predict how the user equipment will change the timers, without explicitly signaling to the user equipment that such changes should be made, thereby allowing the user equipment to operate autonomously but predictably. Thus, no additional signaling may be needed. However, signaling may be used, consistent with autonomous operation, for initially providing the rules of updating the pattern. Alternatively, those rules for updating the pattern may be fixed in the specification.

For handling error situations, namely the case where the network and user equipment due to an error come to have different understanding of the DRX pattern, the network may have the capability to reset the configuration. Signaling can be used for this purpose. For example, the network may simply provide a new discontinuous reception configuration (that is to say, a new initial configuration). Alternatively, the network can provide an explicit reset command. In a further alternative, an implicit mechanism can be used to reset. For example, an automatic reset can be performed upon the occurrence of a predetermined event or after a predetermined length of time.

In addition to inactivity timer length and on-duration timer length, the discontinuous reception cycle length (occurrence of on-duration) can also be done. For example, multiples of the current cycle length could be used, thereby maintaining a known common point (drxStartOffset) of activity to permit recover from errors. Alternatively, a one step approach can be employed where the on-duration periodicity of the discontinuous reception cycle after a given time of inactivity (no active scheduling) is increased to a given second length.

In certain embodiments, not only is an inactivity extended if a user equipment is scheduled, but the inactivity timer length can be more closely adapted to the user equipment's needs. Thus, for example, in certain embodiments the inactivity timer can be shortened when a current full length of it is not needed. Likewise, in certain embodiments, the inactivity timer can be extended when user equipment's active scheduling time is extended by inactivity timer and the user equipment is scheduled during the extended part. Thus, for example, the inactivity timer may not be extended when all scheduling happened within on-duration.

In certain embodiments, the adaptation could be done so that steps to shorten the timer are smaller and the increments larger. For example, increment directly (that is, at an initialization or reset) to a configured starting value and then decrement in small steps. Indeed, the user equipment can be configured only to increment back to an initial configuration, but to decrement progressively in small amounts. Alternatively, the decrements could be in larger amounts and the increments can be in smaller amounts. A desired mix of increments and decrements can be dependent on the relative value of network performance as compared with power usage.

In certain embodiments, the on-duration timer can be adapted instead of or in addition to the inactivity timer. Thus, in certain embodiments the timer adaptation can be applied to both timers.

In certain embodiments the adaptation of the on-duration and/or inactivity timer could depend on the UE state or dedicated signaling. For example, if the UE is no longer UL synchronized UE (and eNB) would apply, for example, a short on-duration timer while longer timer values (like longer on-duration timer) might otherwise be applied.

Jumping directly to a maximum timer setting at scheduling may provide a lowest probability of synchronization loss between a user equipment and a base station such as an eNB. Jumping to a maximum timer setting can also provide re-synchronization of DRX in case of errors.

In certain embodiments, short discontinuous reception (Short DRX) that is activated for a certain time if user equipment is scheduled, even if the user equipment is scheduled just once can be avoided. For example, the discontinuous reception pattern can be adapted based on where and how often within the cycle user equipment is scheduled. Thus, if the pattern is too extensive, the self-adaptation can reduce it and if the pattern is too restrictive, the self-adaptation can extend it. Moreover, rather than being based on a fixed duration, short discontinuous reception can be applied until the traffic and use of the pattern changes. Certain embodiments, therefore, can work with short discontinuous reception or can be used instead of short discontinuous reception Thus, for example, the user equipment and eNB can automatically adjust the discontinuous reception duration (the inactivity timer and the on-duration timer) based on active scheduling (where within the discontinuous reception cycle user equipment is scheduled) without the signaling from eNB.

Accordingly, in certain embodiments the discontinuous reception can be adapted to the changing traffic without explicit reconfiguration signaling. This technique can reduce signaling overhead in the network, which may provide the greatest effect in macro cells, where numerous user equipment may be simultaneously connected and served.

Moreover, in certain embodiments, the discontinuous reception pattern may be updated more often than in a conventional system. Thus, the discontinuous reception pattern may be a closer fit to the user equipment's needs and provide a power savings. Thus, the user equipment can remain active a longer time when scheduling happens, but still use short timers when no active scheduling happens, without additional signaling from a network.

Figure 2:
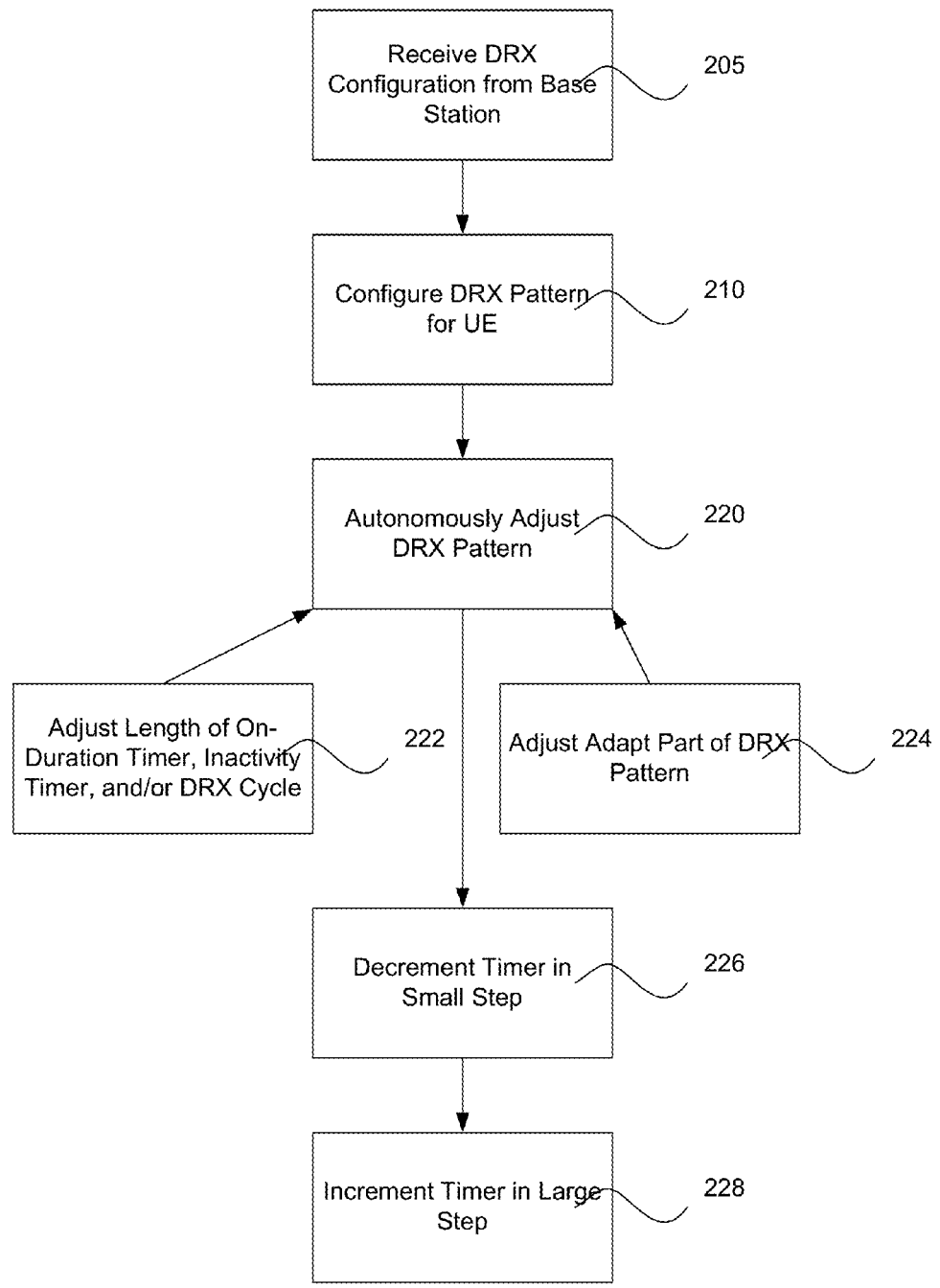
FIG. 2 illustrates a method according to certain embodiments.

FIG. 2 illustrates a method according to certain embodiments. As shown in FIG. 2, a method can include, at 210, configuring a discontinuous reception (DRX) pattern of a user equipment (UE). The configuring can be based on signaling received, at 205, at the user equipment from the base station. This configuring can be an initial configuration. The configuring can alternatively be a new configuration after a period of dynamic adjustment. The configuring can be accomplished in a variety of ways, including by receiving a "reset" command from a base station.

The method can also include, at 220, adjusting the discontinuous reception pattern at the user equipment autonomously with respect to a base station. By "autonomously," it is understood that there is no requirement for there to be signaling from the base station in order to order a particular change in the discontinuous reception pattern. Instead, the user equipment itself adjusts the discontinuous reception pattern without the need for further signaling from the base station, such as enhanced Node B (eNB). For example, the adjusting can be based on at least one rule.

The at least one rule can be one or more of the following: whether the user equipment is scheduled during an on-duration timer, whether the user equipment is scheduled during an inactivity timer, how long an active was in a previous cycle, how long an active time would have needed to be in the previous cycle, and an effective length of active time in previous cycle. Also other rules may be used as input for adjusting the parameters. The scheduling density (for example, how often the UE is scheduled), scheduling periodicity or frequency, and allocation size are some examples.

The adjusting the discontinuous reception pattern can include, at 222, adjusting at least one of a length of an on-duration timer, a length of an inactivity timer, or a length of a discontinuous reception cycle.

The discontinuous reception pattern can include a static part and an adaptive part. The adjusting the discontinuous reception pattern can include, at 224, adjusting the adaptive part.

The adapting can include, at 226, decrementing a timer in first steps and subsequently, at 228, incrementing the timer in a second step, wherein the first steps are individually smaller than the second step. In other words, the decrementing or reducing the length of the timer may take place in amounts that are (in absolute terms) smaller than the amounts by which the timer is increased. These incrementing and decrementing examples are not limiting, but simply illustrate one possible approach.

Figure 3:
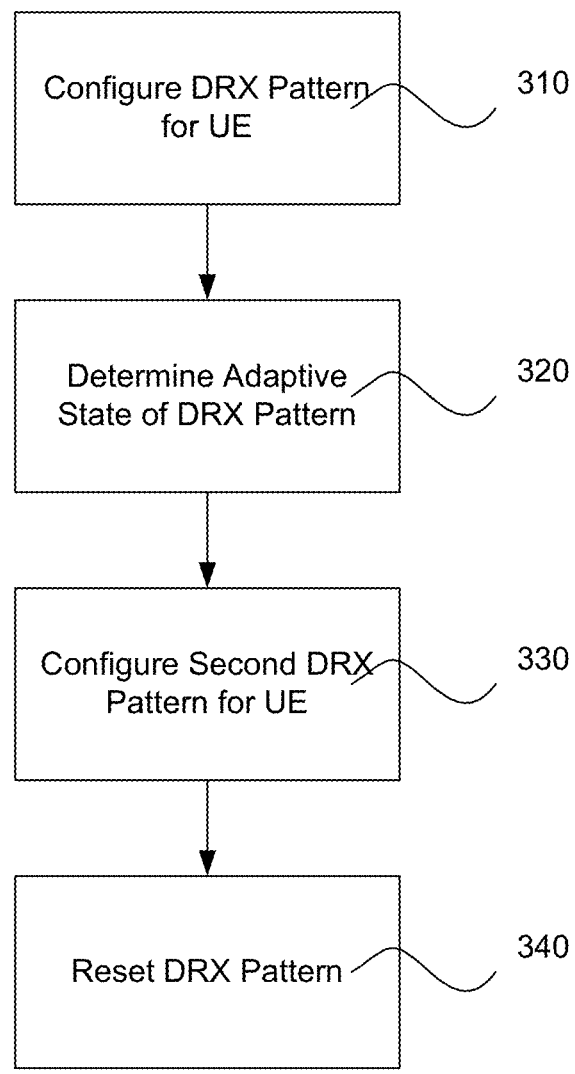
FIG. 3 illustrates another method according to certain embodiments.

FIG. 3 illustrates a method according to certain embodiments. As shown in FIG. 3, at 310, the method can include configuring a discontinuous reception (DRX) pattern of a user equipment (UE). This configuring can involve transmitting a configuration message from a base station (such as an eNode B) to a user equipment.

The method can also include, at 320, determining an adaptive state of the discontinuous reception pattern of the user equipment based on the discontinuous reception pattern and at least one adaptation rule. In other words, knowing what communications have been conducted or scheduled with the user equipment and knowing one or more rule, the base station can predict a current state of the discontinuous reception pattern.

The method can further include, at 330, configuring a second discontinuous reception pattern of the user equipment. This second pattern can be the same or different from the first pattern. Configuring the second pattern may be a way of ensuring synchronization between the user equipment and the base station, in the event that there is ambiguity about whether the state of the user equipment corresponds to a state calculated or otherwise predicted by the base station.

The method can additionally include, at 340, sending a reset command configured to reset the discontinuous reception pattern of the user equipment. The reset command can be an explicit signal from the base station and can be configured to return the user equipment to the initial configuration state with respect to the discontinuous reception pattern.

Figure 4:
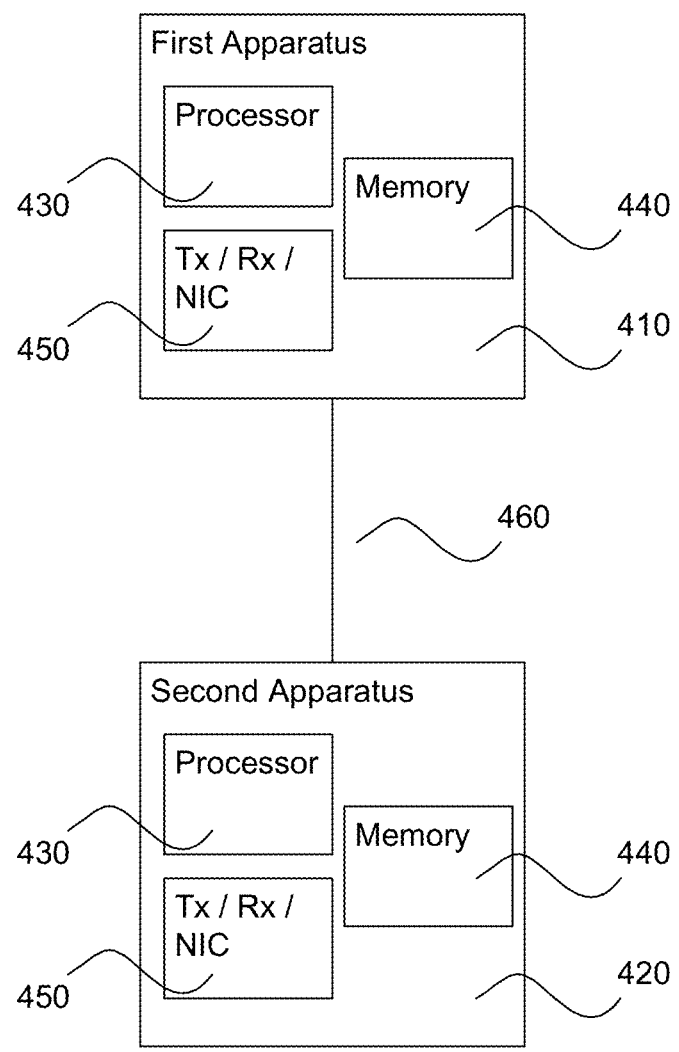
FIG. 4 illustrates a system according to certain embodiments.

FIG. 4 illustrates a system according to certain embodiments. As shown in FIG. 4, the system can include a first apparatus 410 (such as a user equipment) and second apparatus 420 (such as a base station). Each of the apparatuses may be equipped with at least one processor 430, at least one memory 440 (including computer program instructions), and transceiver/network interface card 450. The apparatuses may be configured to communicate with one another over an interface 460, which may be a wireless interface or a plurality of connected interfaces.

The at least one processor 430 can be variously embodied by any computational or data processing device, such as a central processing unit (CPU) or application specific integrated circuit (ASIC). The at least one processor 430 can be implemented as one or a plurality of controllers.

The at least one memory 440 can be any suitable storage device, such as a non-transitory computer-readable medium. For example, a hard disk drive (HDD) or random access memory (RAM) can be used in the at least one memory 440. The at least one memory 440 can be on a same chip as the at least one processor 430, or may be separate from the at least one processor 430.

The computer program instructions may be any suitable form of computer program code. For example, the computer program instructions may be a compiled or interpreted computer program.

The at least one memory 440 and computer program instructions can be configured to, with the at least one processor 430, cause a hardware apparatus (for example, a user equipment or an eNodeB) to perform a process, such as the processes shown in FIGS. 1-3 or any other process described herein.

Thus, in certain embodiments, a non-transitory computer-readable medium can be encoded with computer instructions that, when executed in hardware perform a process, such as one of the processes described above. Alternatively, certain embodiments may be performed entirely in hardware.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:
1. A method, comprising:
configuring a discontinuous reception pattern of a user equipment by configuring at least a length of an on-duration timer and a length of an inactivity timer, wherein the on-duration timer specifies a number of consecutive units of time at a beginning of a discontinuous reception period and wherein the inactivity timer specifies a number of consecutive units of time after successfully decoding a channel; and adjusting the discontinuous reception pattern at the user equipment autonomously with respect to a base station, wherein the inactivity timer is shortened when a current length of the inactivity timer is not needed, the inactivity timer is extended when the user equipment's active scheduling time is extended by the inactivity timer and the user equipment is scheduled during the extended part, and the inactivity timer is not extended when all scheduling occurs within the on-duration timer.

2. The method of claim 1, wherein the configuring is based on signaling received at the user equipment from the base station.

3. The method of claim 1, wherein the adjusting the discontinuous reception pattern comprises adjusting at least one of said length of an on-duration timer, said length of an inactivity timer, or a length of a discontinuous reception cycle.

4. The method of claim 1, wherein the adjusting is based on at least one of whether the user equipment is scheduled during an on-duration timer, whether the user equipment is scheduled during an inactivity timer, how long a timer was active in a previous cycle, how long a timer would have needed to be active in the previous cycle, an effective length of time that a timer was active in the previous cycle, or how long a scheduling pattern was active within the previous cycle.

5. The method of claim 1, wherein the discontinuous reception pattern comprises a static part and an adaptive part and wherein the adjusting the discontinuous reception pattern comprises adjusting the adaptive part.

6. The method of claim 1, wherein the adjusting comprises incrementing the length of at least one of the on-duration timer and the inactivity timer.

7. The method of claim 1, wherein the adjusting comprises decrementing the length of at least one of the on-duration timer and the inactivity timer.

8. A method, comprising:

configuring a discontinuous reception pattern of a user equipment by configuring at least a length of an on-duration timer and a length of an inactivity timer; and adjusting the discontinuous reception pattern at the user equipment autonomously with respect to a base station, wherein the adjusting comprises decrementing at least one of the on-duration timer and the inactivity timer in first steps and subsequently incrementing at least one of the on-duration timer and the inactivity timer in a second step, wherein the first steps are individually smaller than the second step, the inactivity timer is shortened when a current length of the inactivity timer is not needed, the inactivity timer is extended when the user equipment's active scheduling time is extended by the inactivity timer and the user equipment is scheduled during the extended part, and the inactivity timer is not extended when all scheduling occurs within the on-duration timer.

9. A method, comprising:

configuring a discontinuous reception pattern of a user equipment by configuring at least a length of an on-duration timer and a length of an inactivity timer; and determining an adaptive state of the discontinuous reception pattern of the user equipment based on the discontinuous reception pattern and at least one adaptation rule, wherein the inactivity timer is shortened when a current length of the inactivity timer is not needed, the inactivity timer is extended when the user equipment's active scheduling time is extended by the inactivity timer and the user equipment is scheduled during the extended part, and the inactivity timer is not extended when all scheduling occurs within the on-duration timer.

10. The method of claim 9, further comprising:
configuring a second discontinuous reception pattern of the user equipment.

11. The method of claim 9, further comprising:
sending a reset command configured to reset the discontinuous reception pattern of the user equipment.

12. An apparatus, comprising:

at least one processor; and at least one memory including computer program code, wherein the at least one memory and the computer program code are configured to, with the at least one processor, cause the apparatus at least to:

configure a discontinuous reception pattern of a user equipment by configuring at least a length of an on-duration timer and a length of an inactivity timer, wherein the on-duration timer specifies a number of consecutive units of time at a beginning of a discontinuous reception period and wherein the inactivity timer specifies a number of consecutive units of time after successfully decoding a channel; and adjust the discontinuous reception pattern at the user equipment autonomously with respect to a base station, wherein the inactivity timer is shortened when a current length of the inactivity timer is not needed, the inactivity timer is extended when the user equipment's active scheduling time is extended by the inactivity timer and the user equipment is scheduled during the extended part, and the inactivity timer is not extended when all scheduling occurs within the on-duration timer.

13. The apparatus of claim 12, wherein the at least one memory and the computer program code are configured to, with the at least one processor, cause the apparatus at least to configure the discontinuous reception pattern based on signaling received at the user equipment from the base station.

14. The apparatus of claim 12, wherein the at least one memory and the computer program code are configured to, with the at least one processor, cause the apparatus at least to adjust the discontinuous reception pattern by adjusting at least one of said length of an on-duration timer, said length of an inactivity timer, or a length of a discontinuous reception cycle.

15. The apparatus of claim 12, wherein the at least one memory and the computer program code are configured to, with the at least one processor, cause the apparatus at least to adjust the discontinuous reception pattern based on at least one of whether the user equipment is scheduled during an on-duration timer, whether the user equipment is scheduled during an inactivity timer, how long a timer was active in a previous cycle, how long a timer would have needed to be active in the previous cycle, or an effective length of time that a timer was active in the previous cycle.

16. The apparatus of claim 12, wherein the discontinuous reception pattern comprises a static part and an adaptive part and wherein the at least one memory and the computer program code are configured to, with the at least one processor, cause the apparatus at least to adjust the discontinuous reception pattern by adjusting the adaptive part.

17. An apparatus, comprising:
at least one processor; and
at least one memory including computer program code,
wherein the at least one memory and the computer program code are configured to, with the at least one processor, cause the apparatus at least to:
configure a discontinuous reception pattern of a user equipment by configuring at least a length of an on-duration timer and a length of an inactivity timer; and
adjust the discontinuous reception pattern at the user equipment autonomously with respect to a base station,
wherein the at least one memory and the computer program code are configured to, with the at least one processor, cause the apparatus at least to adjust the discontinuous reception pattern by decrementing at least one of the on-duration timer and the inactivity timer in first steps and subsequently incrementing at least one of the on-duration timer and the inactivity timer in a second step, wherein the first steps are individually smaller than the second step, wherein
the inactivity timer is shortened when a current length of the inactivity timer is not needed,
the inactivity timer is extended when the user equipment's active scheduling time is extended by the inactivity timer and the user equipment is scheduled during the extended part, and
the inactivity timer is not extended when all scheduling occurs within the on-duration timer.

18. An apparatus, comprising:
at least one processor; and
at least one memory including computer program code,
wherein the at least one memory and the computer program code are configured to, with the at least one processor, cause the apparatus at least to
configure a discontinuous reception pattern of a user equipment by configuring at least a length of an on-duration timer and a length of an inactivity timer, wherein the on-duration timer specifies a number of consecutive units of time at a beginning of a discontinuous reception period and wherein the inactivity timer specifies a number of consecutive units of time after successfully decoding a channel; and
determine an adaptive state of the discontinuous reception pattern of the user equipment based on the discontinuous reception pattern and at least one adaptation rule, wherein
the inactivity timer is shortened when a current length of the inactivity timer is not needed,
the inactivity timer is extended when the user equipment's active scheduling time is extended by the inactivity timer and the user equipment is scheduled during the extended part, and
the inactivity timer is not extended when all scheduling occurs within the on-duration timer.

19. The apparatus of claim 18, wherein the at least one memory and the computer program code are configured to, with the at least one processor, cause the apparatus at least to configure a second discontinuous reception pattern of the user equipment.

20. The apparatus of claim 18, wherein the at least one memory and the computer program code are configured to, with the at least one processor, cause the apparatus at least to send a reset command configured to reset the discontinuous reception pattern of the user equipment.

* * * * *